United States Patent
Hori et al.

(10) Patent No.: US 10,121,995 B2
(45) Date of Patent: Nov. 6, 2018

(54) BATTERY PACKAGING MATERIAL

(71) Applicant: DAI NIPPON PRINTING CO., LTD., Tokyo (JP)

(72) Inventors: Yaichiro Hori, Tokyo (JP); Shunsuke Ueda, Tokyo (JP); Makoto Amano, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

(21) Appl. No.: 15/512,402

(22) PCT Filed: Sep. 25, 2015

(86) PCT No.: PCT/JP2015/077209
§ 371 (c)(1),
(2) Date: Mar. 17, 2017

(87) PCT Pub. No.: WO2016/047790
PCT Pub. Date: Mar. 31, 2016

(65) Prior Publication Data
US 2017/0271629 A1     Sep. 21, 2017

(30) Foreign Application Priority Data
Sep. 26, 2014  (JP) .................................. 2014-197012

(51) Int. Cl.
*H01M 2/02* (2006.01)
*B32B 15/08* (2006.01)
(Continued)

(52) U.S. Cl.
CPC ........... *H01M 2/0287* (2013.01); *B32B 15/08* (2013.01); *B32B 15/20* (2013.01); *H01G 11/78* (2013.01);
(Continued)

(58) Field of Classification Search
CPC .............................. H01M 2/02; H01M 2/0287
See application file for complete search history.

(56) References Cited

U.S. PATENT DOCUMENTS

| | | |
|---|---|---|
| 2003/0180609 A1 | 9/2003 | Yamashita et al. |
| 2008/0286635 A1 | 11/2008 | Seino et al. |
| 2015/0155531 A1 | 6/2015 | Takahagi et al. |

FOREIGN PATENT DOCUMENTS

| | | |
|---|---|---|
| JP | 2003-051291 A | 2/2003 |
| JP | 2004-047246 A | 2/2004 |

(Continued)

OTHER PUBLICATIONS

Nov. 10, 2015 International Search Report issued in International Patent Application No. PCT/JP2015/077209.

*Primary Examiner* — Olatunji A Godo
(74) *Attorney, Agent, or Firm* — Oliff PLC

(57) ABSTRACT

Provided is a battery packaging material that comprises a laminated body formed by sequentially stacking at least a base layer, a metal layer, and a sealant layer, and that has a thin overall thickness, and has excellent formability and piercing strength. This battery packaging material comprises a laminated body formed by sequentially stacking at least a base layer, a metal layer, and a sealant layer, with the overall thickness of the laminated body being 50-80 μm, and the ratio of the sum of the thicknesses of the base layer and the metal layer with respect to the overall thickness of the laminated body being in a range of 0.380-0.630.

8 Claims, 1 Drawing Sheet

(51) Int. Cl.
    *H01G 11/78*     (2013.01)
    *B32B 15/20*     (2006.01)
    *H01M 2/08*     (2006.01)

(52) U.S. Cl.
    CPC ............ *H01M 2/02* (2013.01); *H01M 2/028* (2013.01); *H01M 2/08* (2013.01); *B32B 2250/03* (2013.01); *B32B 2457/10* (2013.01)

(56) References Cited

FOREIGN PATENT DOCUMENTS

| | | |
|---|---|---|
| JP | 2005-297448 A | 10/2005 |
| JP | 2008-287971 A | 11/2008 |
| JP | 2012-014915 A | 1/2012 |
| JP | 2012-124067 A | 6/2012 |
| WO | WO 01/57941 * | 8/2001 |
| WO | 2013/183511 A1 | 12/2013 |

* cited by examiner

BATTERY PACKAGING MATERIAL

TECHNICAL FIELD

The present invention relates to a battery packaging material having a small thickness, and excellent moldability and piercing strength.

BACKGROUND ART

Various types of batteries have been developed heretofore, and in every battery, a packaging material is an essential member for sealing battery elements such as an electrode and an electrolyte. Metallic packaging materials have been often used heretofore as battery packages, but in recent years, batteries have been required to be diversified in shape, and desired to be thinner and lighter as performance of, for example, electric cars, hybrid electric cars, personal computers, cameras and mobile phones has been enhanced. However, metallic battery packaging materials that have often been heretofore used have the disadvantage that it is difficult to keep up with diversification in shape, and there is a limit on weight reduction.

Thus, a film-shaped laminate with a base material layer, an adhesive layer, a metal layer and a sealant layer laminated in this order has been proposed as a battery packaging material which is easily processed into diversified shapes and is capable of achieving thickness reduction and weight reduction (see, for example, Patent Document 1). Such a film-shaped battery packaging material is formed in such a manner that a battery element can be sealed by heat-welding the peripheral edge through heat sealing, with the sealant layers facing each other.

Particularly, lithium batteries that are used in notebook-type personal computers and mobile devices (portable devices) such as a smartphone are desired to have a reduced thickness and weight, and battery packaging materials having a very small thickness of about 100 μm are generally used for these batteries. In recent years, further thickness reduction and weight reduction of mobile products, capacity enlargement of lithium batteries, and so on have been desired, and accordingly batteries packaging materials have been required to have a further reduced thickness.

However, when the thickness of a battery packaging material is to be reduced by merely equally thinning a base material layer, a metal foil layer and a sealant layer, the base material layer and the metal layer become excessively thin, leading to an increase in probability of generation of pinholes during molding. On the other hand, reduction of the molding depth for suppressing generation of pinholes causes a serious problem of hindering capacity enlargement of a lithium battery. When the base material layer becomes thin, piercing strength is reduced, leading to bag-breakage of a lithium battery due to impact from the outside, and when the sealant layer is thinned, there arises a problem of impairing a sealing property, an insulation quality and electrolytic solution resistance.

PRIOR ART DOCUMENT

Patent Document

Patent Document 1: Japanese Patent Laid-open Publication No. 2008-287971

SUMMARY OF THE INVENTION

Problem to be Solved by the Invention

A main object of the present invention is to provide a battery packaging material including a laminate having at least a base material layer, a metal layer and a sealant layer laminated in this order, the battery packaging material having a small total thickness, and excellent moldability and piercing strength.

Means for Solving the Problem

The present inventors have extensively conducted studies for achieving the above-mentioned object. Resultantly, the present inventors have found that in a battery packaging material including a laminate having at least a base material layer, a metal layer and a sealant layer laminated in this order, moldability in the first place, piercing strength in the second place, and a sealing property, an insulation quality and electrolytic solution resistance in the third place can be each made to fall within a property value range acceptable as a battery packaging material by controlling the ratio of the thickness of each layer or a combination of a plurality of layers to the total thickness of the battery packaging material rather than merely equally thinning the layers. The present invention has been completed by further conducting studies based on the above-mentioned findings.

That is, the present invention provides a battery packaging material and a battery of the following aspects.

Item 1. A battery packaging material including a laminate having at least a base material layer, a metal layer and a sealant layer laminated in this order, wherein
  a total thickness of the laminate is in a range of 50 to 80 μm, and
  a ratio of a sum of thicknesses of the base material layer and the metal layer to a total thickness of the laminate is in a range of 0.380 to 0.630.

Item 2. The battery packaging material according to item 1, wherein a ratio of a thickness of the sealant layer to the total thickness of the laminate is in a range of 0.300 to 0.570.

Item 3. The battery packaging material according to item 1 or 2, wherein
  the thickness of the base material layer is in a range of 9 to 25 μm,
  the thickness of the metal layer is in a range of 15 to 30 μm, and
  the thickness of the sealant layer is in a range of 22 to 35 μm.

Item 4. The battery packaging material according to any one of items 1 to 3, wherein the base material layer is a biaxially stretched nylon film or a biaxially stretched PET film.

Item 5. The battery packaging material according to any one of items 1 to 4, wherein the metal layer is formed of aluminum foil.

Item 6. A battery including a battery element including at least a positive electrode, a negative electrode and an electrolyte, the battery element being stored in the battery packaging material according to any one of items 1 to 5.

Item 7. A method for producing a battery, the method including:
  a step of storing in a battery packaging material a battery element including at least a positive electrode, a negative electrode and an electrolyte, wherein the battery packaging material includes a laminate having at least a base material layer, a metal layer and a sealant layer laminated in this order,
a total thickness of the laminate is in a range of 50 to 80 μm, and
a ratio of a sum of thicknesses of the base material layer and the metal layer to a total thickness of the laminate is in a range of 0.380 to 0.630.

Item 8. Use, as a battery packaging material, of a laminate having at least a base material layer, a metal layer and a sealant layer laminated in this order, wherein
a total thickness of the laminate is in the range of 50 to 80 μm, and
a ratio of a sum of thicknesses of the base material layer and the metal layer to a total thickness of the laminate is in a range of 0.380 to 0.630.

Advantages of the Invention

According to the present invention, the ratio of the sum of the thicknesses of a base material layer and a metal layer that are included in a laminate that forms a battery packaging material to the total thickness of the laminate is set in a specific range, and thus there can be provided a battery packaging material having excellent moldability and piercing strength although the total thickness of the battery packaging material is very small. Further, in the present invention, properties such as a sealing property, an insulation quality and electrolytic solution resistance can be effectively improved by controlling the ratio of the thickness of each layer or a combination of a plurality of layers to the total thickness of the battery packaging material.

EMBODIMENT OF THE INVENTION

A battery packaging material according to the present invention includes a laminate having at least a base material layer, a metal layer and a sealant layer laminated in this order, in which a total thickness of the laminate is in a range of 50 to 80 μm, and a ratio of a sum of thicknesses of the base material layer and the metal layer to a total thickness of the laminate is in a range of 0.380 to 0.630. Hereinafter, the battery packaging material according to the present invention will be described in detail.

1. Laminated Structure of Battery Packaging Material

Figure 1:
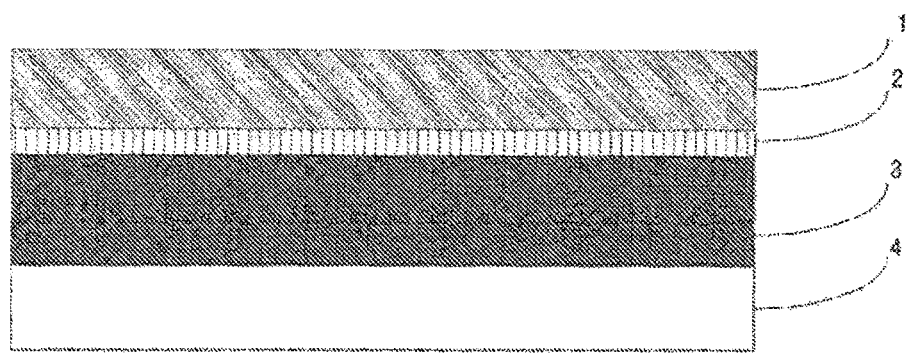
FIG. 1 is a drawing showing one example of a cross-sectional structure of a battery packaging material according to the present invention.

The battery packaging material includes a laminate having at least a base material layer 1, a metal layer 3 and a sealant layer 4 laminated in this order as shown in FIG. 1. In the battery packaging material according to the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element therein, so that the battery element is encapsulated.

Figure 2:
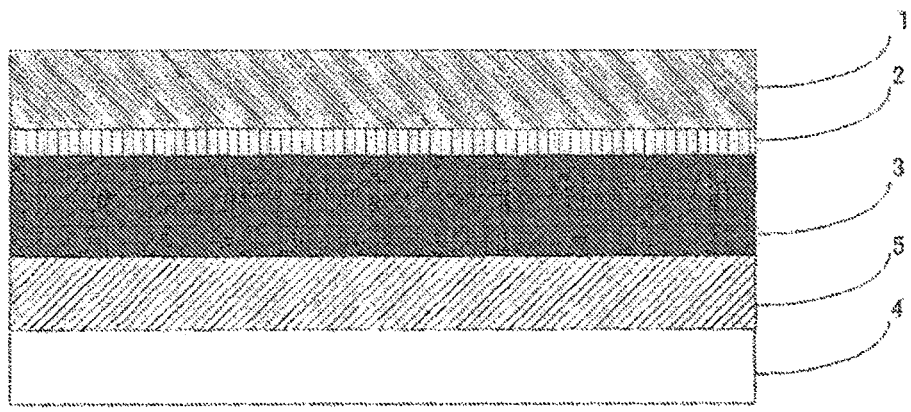
FIG. 2 is a drawing showing one example of a cross-sectional structure of a battery packaging material according to the present invention.

As shown in FIG. 1, the battery packaging material according to the present invention may be provided with an adhesive layer 2 between the base material layer 1 and the metal layer 3 as necessary in order to improve adhesion of these layers. As shown in FIG. 2, an adhesive layer 5 may be provided between the metal layer 3 and the sealant layer 4 as necessary in order to improve adhesiveness of these layers.

2. Thickness of Layers Forming Battery Packaging Material

The total thickness of the laminate that forms the battery packaging material according to the present invention is in the range of 50 to 80 μm. When a battery packaging material has a total thickness of 80 m or less, the battery packaging material is extremely thin, and in normal design, pinholes are very easily generated during molding, and piercing strength is reduced. On the other hand, in the battery packaging material according to the present invention, the thickness of the laminate is set in the range of 50 to 80 μm, and additionally, the ratio of the sum of the thicknesses of the base material layer and the metal layer to the total thickness of the laminate is set in the range of 0.380 to 0.630, to give the battery packaging material having excellent moldability and piercing strength. In the present invention, the total thickness of the laminate that forms the battery packaging material is a value obtained by measuring the center portion of the battery packaging material with use of a micro-gauge.

Further, in the present invention, the ratio of the thickness of each layer or a combination of a plurality of layers to the total thickness of the battery packaging material can be set in a range described later to effectively improve properties such as a sealing property, an insulation quality and electrolytic solution resistance that are described later.

The total thickness of the laminate is further preferably in the range of 54 to 76 μm for ensuring that properties as described above are more suitably exhibited while the total thickness of the battery packaging material is made very small so that it is in the above-mentioned range.

The ratio of the sum of the thicknesses of the later-described base material layer 1 and metal layer 3 to the total thickness of the laminate ([base material layer 1+metal layer 3]/total thickness) is further preferably in the range of 0.400 to 0.625 for ensuring that properties as described above are more suitably exhibited while the total thickness of the battery packaging material is made very small so that it is in the above-mentioned range.

From the same point of view, the ratio of the thickness of the later-described sealant layer 4 to the total thickness of the laminate (sealant layer4/total thickness) is preferably in the range of 0.300 to 0.570, further preferably in the range of 0.310 to 0.550.

From the same point of view, the ratio of the thickness of the base material layer 1 to the thickness of the metal layer 3 (base material layer 1/metal layer 3) is preferably in the range of 0.450 to 1.700, further preferably in the range of 0.480 to 1.500.

From the same point of view, the ratio of the thickness of the base material layer 1 to the sum of the thicknesses of the base material layer 1 and the metal layer 3 (base material layer 1/base material layer 1 and metal layer 3) is preferably in the range of 0.324 to 0.444, further preferably in the range of 0.324 to 0.380.

From the same point of view, the ratio of the thickness of the sealant layer 4 to the sum of the thicknesses of the base material layer 1 and the metal layer 3 (sealant layer 4/base material layer 1 and metal layer 3) is preferably in the range of 0.489 to 1.458, further preferably in the range of 0.533 to 1.400.

Further, from the same point of view, it is especially preferable that the thickness of the base material layer 1 is in the range of 9 to 25 μm, the thickness of the metal layer 3 is in the range of 15 to 30 μm, and the thickness of the sealant layer 4 is in the range of 22 to 35 μm.

3. Properties of Battery Packaging Material (Moldability)

In the battery packaging material according to the present invention, the total thickness of the laminate is set in the above-mentioned range, and the ratio of the sum of the thicknesses of the base material layer and the metal layer to the total thickness of the laminate is set in the above-mentioned range, to give the battery packaging material having excellent moldability although its thickness is very small. Specifically, even when the battery packaging material is molded under such a severe condition that cold molding is performed at a molding depth of 6 mm with the battery packaging material pressed at a pressing pressure (surface pressure) of 0.1 MPa, pinholes and cracks in the metal layer in the molded battery packaging material are effectively suppressed. More specifically, evaluation of moldability can be performed by a method as described in Examples.

(Piercing Strength)

In the battery packaging material according to the present invention, the total thickness of the laminate is set in the above-mentioned range, and the ratio of the sum of the thicknesses of the base material layer and the metal layer to the total thickness of the laminate is set in the above-mentioned range, to give the battery packaging material having excellent piercing strength although its thickness is very small. More specifically, for example, the maximum stress measured in accordance with the specifications of JIS 1707: 1997 may be 10 N or more, preferably 12 to 15 N. In the measurement, the battery packaging material is pierced with a needle having a diameter of 1.0 mm and a semicircular tip shape with a radius of 0.5 mm at a rate of 50±5 mm per minute, and the maximum stress during passage of the needle through the battery packaging material is measured. Evaluation of piercing strength can be performed more specifically by a method described in Examples.

(Resilience)

In the battery packaging material according to the present invention, the total thickness of the laminate is set in the above-mentioned range, and the ratio of the sum of the thicknesses of the base material layer and the metal layer to the total thickness of the laminate is set in the above-mentioned range, to give the battery packaging material having excellent resilience (bendability) although its thickness is very small. More specifically, for example, the loop stiffness value measured by LOOP STIFFNESS TESTER manufactured by TOYO SEIKI Co., Ltd. (measurement conditions: sample width 15 mm, loop circumference 100 mm, post-crushing remaining distance 15 mm) may be preferably in the range of 5.0 g to 15.0 g, more preferably in the range of 5.5 g to 12.0 g. Evaluation of resilience can be performed more specifically by a method described in Examples.

(Insulation Quality)

In the battery packaging material according to the present invention, the total thickness of the laminate, and the ratio of the sum of the thicknesses of the base material layer and the metal layer to the total thickness of the laminate are each set in the above-mentioned range, and the ratio of the thickness of the sealant layer to the total thickness of the laminate is set in the above-mentioned range, to give the battery packaging material having an excellent insulation quality although its thickness is very small. Specifically, for example, the resistance value may be 1 MΩ or more, preferably 1 to 10 MΩ that is measured by heat-sealing sealant layers with an aluminum tab sandwiched therebetween, connecting a terminal of a tester to a surface of each of base material layers on both sides, and applying a voltage of DC 25 V between the testers for 15 seconds. Evaluation of an insulation quality can be performed more specifically by a method described in Examples.

(Sealing Strength)

In the battery packaging material according to the present invention, the total thickness of the laminate, and the ratio of the sum of the thicknesses of the base material layer and the metal layer to the total thickness of the laminate are each set in the above-mentioned range, and further, the ratio of the thickness of the sealant layer to the total thickness of the laminate is set in the above-mentioned range, to give the battery packaging material having excellent sealing strength although its thickness is very small. Specifically, for example, the sealing strength may be 40 N/15 mm or more, preferably 60 to 75 N/15 mm that is obtained by heat-sealing sealant layers of the battery packaging material at a sealing temperature of 190° C. and a surface pressure of 1.0 MPa for a sealing time of 3.0 seconds, drawing a heat-sealed portion at a rate of 300 mm/second with a tension machine, and measuring the sealing strength. Evaluation of sealing strength can be performed more specifically by a method described in Examples.

(Electrolytic Solution Resistance)

In the battery packaging material according to the present invention, the total thickness of the laminate, and the ratio of the sum of the thicknesses of the base material layer and the metal layer to the total thickness of the laminate are each set in the above-mentioned range, and further, the ratio of the thickness of the sealant layer to the total thickness of the laminate is set in the above-mentioned range, to give the battery packaging material having excellent electrolytic solution resistance although its thickness is very small. Specifically, for example, delamination does not occur when a battery packaging material is molded so as to form a concave portion on the sealant layer side, the concave portion is filled with an electrolytic solution (including 1 M $LiPF_6$ and a mixed liquid of ethylene carbonate, diethyl carbonate and dimethyl carbonate (volume ratio 1:1:1)), another battery packaging material is superimposed on the concave portion in such a manner that the sealant layers face each other, the battery packaging materials are heat-sealed at the peripheral edge portion, stored at 85° C. for 1 day, and unsealed, and it is visually checked whether or not delamination occurs between the metal layer and the sealant layer. Evaluation of electrolytic solution resistance can be performed more specifically by a method described in Examples.

For ensuring that properties as described above are more suitably exhibited, while the total thickness is made very small so that it is in the above-mentioned range, by setting the total thickness of the laminate that forms the battery packaging material according to the present invention in the above-mentioned range and setting the ratio of the sum of the thicknesses of the base material layer and the metal layer to the total thickness of the laminate in the above-mentioned range, the compositions, properties, thicknesses and so on of the base material layer 1, the adhesive layer 2 provided as necessary, the metal layer 3, the adhesive layer 5 provided as necessary, and the sealant layer 4, each of which forms the battery packaging material, may be appropriately adjusted. Hereinafter, the properties of the battery packaging material according to the present invention, and the layers that form the battery packaging material will be described in detail.

4. Composition of Each Layer Forming Battery Packaging Material

[Base Material Layer 1]

In the battery packaging material according to the present invention, the base material layer 1 is a layer that forms the outermost layer. The material that forms the base material layer 1 is not particularly limited as long as it has an insulation quality. Examples of the material that forms the base material layer 1 include resin films of a polyester resin, a polyamide resin, an epoxy resin, an acrylic resin, a fluororesin, a polyurethane resin, a silicone resin, a phenol resin and mixtures and copolymers thereof. Among them, a polyester resin and a polyamide resin are preferred, and a biaxially stretched polyester resin and a biaxially stretched polyamide resin are more preferred. Specific examples of the polyester resin include polyethylene terephthalate, polybutylene terephthalate, polyethylene naphthalate, polybutylene naphthalate, a copolyester and polycarbonate. Specific examples of the polyamide resin include nylon 6, nylon 6,6, a copolymer of nylon 6 and nylon 6,6, nylon 6,10, and polymethaxylyleneadipamide (MXD6).

The base material layer 1 may be formed of a single layer resin film, or may be formed of a resin film having two or more layers for improving pinhole resistance and an insulation quality. When the base material layer 1 is to be formed of a multilayer resin film, two or more resin films may be laminated together with an adhesive component such as an adhesive agent or an adhesive resin interposed therebetween, and the kind, amount and so on of the adhesive component to be used are similar to those for the later-described adhesive layer 2 or adhesive layer 5. The method for laminating a resin film having two or more layers is not particularly limited, and a known method can be employed. Examples thereof include a dry lamination method and a sand lamination method, and a dry lamination method is preferred. When the resin film is laminated by a dry lamination method, it is preferred to use a urethane-based adhesive agent as an adhesive layer. Here, the thickness of the adhesive layer is, for example, about 2 to 5 μm.

For ensuring that properties as described above are more suitably exhibited while the total thickness of the battery packaging material is made very small so that it is in the above-mentioned range, the thickness of the base material layer 1 is as exemplified above.

[Adhesive Layer 2]

In the battery packaging material according to the present invention, the adhesive layer 2 is a layer provided between the base material layer 1 and the metal layer 3 as necessary for strongly bonding these layers to each other.

The adhesive layer 2 is formed from an adhesive agent capable of bonding the base material layer 1 and the metal layer 3. The adhesive agent used for forming the adhesive layer 2 may be a two-liquid curable adhesive agent, or may be a one-liquid curable adhesive agent. Further, the adhesion mechanism of the adhesive agent used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyester-based resins such as polyethylene terephthalate, polybutylene terephthalate, polyethylene naphthalate, polybutylene naphthalate, polyethylene isophthalate, polycarbonate and a copolyester; polyether-based adhesive agents; polyurethane-based adhesive agents; epoxy-based resins; phenol resin-based resins; polyamide-based resins such as nylon 6, nylon 66, nylon 12 and a copolymerized polyamide; polyolefin-based resins such as a polyolefin, a carboxylic acid-modified polyolefin and a metal-modified polyolefin, and a polyvinyl acetate-based resin; cellulose-based adhesive agents; (meth) acryl-based resins; polyimide-based resins; amino resins such as a urea resin and a melamine resin; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesive agents are preferred.

For ensuring that properties as described above are more suitably exhibited while the total thickness of the battery packaging material is made very small so that it is in the above-mentioned range, the thickness of the adhesive layer 2 is preferably about 3 to 4 μm.

[Metal Layer 3]

In the battery packaging material, the metal layer 3 is a layer that improves the strength of the battery packaging material, and functions as a barrier layer for preventing ingress of water vapor, oxygen, light and the like into the battery. Specific examples of the metal forming the metal layer 3 include aluminum, stainless steel and titanium, with aluminum being preferred. The metal layer 3 can be formed from metal foil or by metal deposition, and is preferably formed from metal foil, more preferably from aluminum foil. From the viewpoint of preventing generation of wrinkles and pinholes in the metal layer 3 during production of the battery packaging material, it is more preferred to form the metal layer 3 from soft aluminum foil such as annealed aluminum (JIS A8021P-O, JIS A8079P-O).

For ensuring that properties as described above are more suitably exhibited while the total thickness of the battery packaging material is made very small so that it is in the above-mentioned range, the thickness of the metal layer 3 is as exemplified above.

Preferably, at least one surface, preferably both surfaces, of the metal layer 3 are subjected to a chemical conversion treatment for stabilization of bonding, prevention of dissolution and corrosion, and so on. Here, the chemical conversion treatment is a treatment for forming an acid resistance film on the surface(s) of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, the repeating units represented by the following general formulae (1) to (4) may be contained alone, or may be contained in combination of two or more thereof.

[Chemical Formula 1]

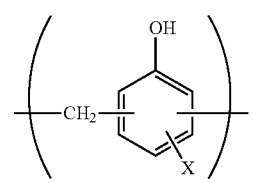

(1)

-continued

[Chemical Formula 2]

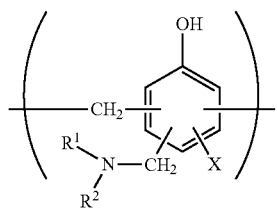
(2)

[Chemical Formula 3]

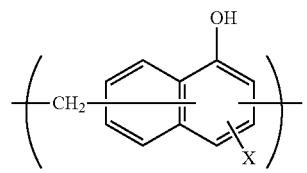
(3)

[Chemical Formula 4]

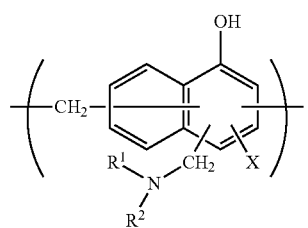
(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl groups and the hydroxyalkyl groups represented by X, $R^1$ and $R^2$ may be the same or different respectively. In the general formulae (1) to (4), X is preferably a hydrogen atom, a hydroxyl group or a hydroxyalkyl group. A number average molecular weight of the aminated phenol polymer having repeating units represented by the general formula (1) to (4) is preferably about 500 to 1000000, and more preferably about 1000 to 20000, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound and an aminated phenol polymer in combination, and so on are preferred.

The amount of the acid resistance film to be formed on the surface of the metal layer 3 in the chemical conversion treatment is not particularly limited, but for example, when the above-mentioned chromate treatment is performed, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied onto the surface of the metal layer 3 by a bar coating method, a roll coating method, a gravure coating method, an immersion method or the like, and heating is then performed so that the temperature of the metal layer 3 is about 70° C. to 200° C. The metal layer 3 may be subjected to a degreasing treatment by an alkali immersion method, an electrolytic cleaning method, an acid cleaning method, an electrolytic acid cleaning method or the like before the metal layer 3 is subjected to a chemical conversion treatment. When a degreasing treatment is performed as described above, the chemical conversion treatment of the surface of the metal layer 3 can be further efficiently performed.

[Sealant Layer 4]

In the battery packaging material according to the present invention, the sealant layer 4 corresponds to the innermost layer, and at the time of assembling a battery, the sealant layers are heat-welded to each other to hermetically seal the battery element therein.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may include only one layer, or two or more layers formed of the same resin component or different resin components.

For ensuring that properties as described above are more suitably exhibited while the total thickness of the battery packaging material is made very small so that it is in the above-mentioned range, the thickness of the sealant layer 4 is as exemplified above. When the sealant layer 4 includes two or more layers, the thickness means the total thickness of the sealant layer 4.

[Adhesive Layer 5]

In the battery packaging material according to the present invention, the adhesive layer 5 is a layer that is provided between the metal layer 3 and the sealant layer 4 as necessary for strongly bonding these layers to each other.

The adhesive layer 5 is formed from an adhesive agent component capable of bonding the metal layer 3 and the above-mentioned sealant layer 4. The adhesive agent used for forming the adhesive layer 5 may be a two-liquid curable adhesive agent, or may be a one-liquid curable adhesive agent. Further, the bonding mechanism of the adhesive component used for forming the adhesive layer 5 is not particularly limited, and examples thereof include a chemical reaction type, a solvent volatilization type, a heat melting type and a heat pressing type.

Specific examples of the adhesive agent component that can be used for forming the adhesive layer 5 include polyester-based resins such as polyethylene terephthalate, polybutylene terephthalate, polyethylene naphthalate, polybutylene naphthalate, polyethylene isophthalate, polycarbonate and a copolyester; polyether-based adhesive agents; polyurethane-based adhesive agents; epoxy-based resins; phenol resin-based resins; polyamide-based resins such as nylon 6, nylon 66, nylon 12 and a copolymerized polyamide; polyolefin-based resins such as a polyolefin, a carboxylic acid-modified polyolefin and a metal-modified polyolefin, polyvinyl acetate-based resins; cellulose-based adhesive agents; (meth)acryl-based resins; polyimide-based resins; amino resins such as a urea resin and a melamine resin; rubbers such as chloroprene rubber, nitrile rubber and styrene-butadiene rubber; and silicone-based resins. These adhesive components may be used alone, or may be used in combination of two or more thereof.

For ensuring that properties as described above are more suitably exhibited while the total thickness of the battery packaging material is made very small so that it is in the above-mentioned range, the thickness of the adhesive layer 5 is preferably about 2 to 5 μm.

[Coating Layer]

In the battery packaging material according to the present invention, a coating layer (not illustrated) may be provided on the base material layer 1 (on the base material layer 1 on a side opposite to the metal layer 3) as necessary for the purpose of, for example, improving designability, electrolytic solution resistance, scratch resistance and moldability. The coating layer is a layer that is situated at an outermost layer when a battery is assembled.

The coating layer can be formed from, for example, polyvinylidene chloride, a polyester resin, a urethane resin, an acrylic resin, an epoxy resin, or the like. Preferably, the coating layer is formed from a two-liquid curable resin among the resins described above. Examples of the two-liquid curable resin that forms the coating layer include two-liquid curable urethane resins, two-liquid curable polyester resins and two-liquid curable epoxy resins. The coating layer may contain a matting agent.

Examples of the matting agent include fine particles having a particle size of about 0.5 nm to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and a dispersibility enhancing treatment.

The method for forming the coating layer is not particularly limited, and examples thereof include a method in which a two-liquid curable resin for forming the coating layer is applied to one of the surfaces of the base material layer 1. In the case where a matting agent is blended, the matting agent may be added to and mixed with the two-liquid curable resin, followed by applying the mixture.

For ensuring that properties as described above are more suitably exhibited while the total thickness of the battery packaging material is made very small so that it is in the above-mentioned range, the thickness of the coating layer is preferably about 1 to 4 μm.

5. Method for Producing Battery Packaging Material

While the method for producing the battery packaging material according to the present invention is not particularly limited as long as a laminate in which layers each having predetermined composition are laminated is obtained, for example the following method is shown as an example.

First, a laminate having the base material layer 1, the adhesive layer 2 and the metal layer 3 laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mentioned is provided, for example, by (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which the adhesive layer 5 is laminated on the metal layer 3 of the laminate A by, for example, a method of applying an adhesive agent for formation of the adhesive layer 5 onto the metal layer 3 with an extrusion method or solution coating, drying and further baking the adhesive agent-applied metal layer 3 at a high temperature, and the sealant layer 4 formed in a sheet-shaped film beforehand is laminated on the adhesive layer 5 by a thermal lamination method; and (4) a method in which the melted adhesive layer 5 is poured between the metal layer 3 of the laminate A and the sealant layer 4 formed in a sheet-shaped film beforehand, and simultaneously the laminate A and the sealant layer 4 are bonded together with the adhesive layer 5 interposed therebetween (sandwich lamination method).

When the coating layer is provided, the coating layer is laminated on a surface of the base material layer 1 on a side opposite to the metal layer 3. The coating layer can be formed by, for example, coating a surface of the base material layer 1 with an above-mentioned resin that forms the coating layer. The order of the step of laminating the metal layer 3 on a surface of the base material layer 1 and the step of laminating the coating layer on a surface of the base material layer 1 is not particularly limited. For example, the coating layer may be formed on a surface of the base material layer 1, followed by forming the metal layer 3 on a surface of the base material layer 1 on a side opposite to the coating layer.

A laminate including the base material layer 1, the adhesive layer 2, the metal layer 3, the surface of which is subjected to a chemical conversion treatment as necessary, the adhesive layer 5 provided as necessary, the sealant layer 4, and the coating layer provided as necessary is formed in the manner described above, and the laminate may be further subjected to a heating treatment of a hot roll contact type, a hot air type, a near- or far-infrared type, or the like for strengthening the adhesion of the adhesive layer 2 and the adhesive layer 5 provided as necessary. As conditions for such a heating treatment, for example, the temperature is 150 to 250° C., and the time is 1 to 5 minutes.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

6. Use of Battery Packaging Material

The battery packaging material according to the present invention is used as a packaging material for hermetically sealing therein and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where a sealant layer is in contact with itself) can be formed on the periphery of the battery element while a metal terminal connected to each of the positive electrode and the negative electrode protrudes to the outside, and the sealant layer at the flange portion is heat-sealed with itself thereby providing a battery hermetically sealed with a battery packaging material in the battery packaging material. When the battery element is stored in the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of the secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted, however, that the present invention is not limited to the examples.

Examples 1 to 26 and Comparative Examples 1 to 4

<Production of Battery Packaging Material>

A battery packaging material including a laminate with a base material layer 1, an adhesive layer 2, a metal layer 3 and a sealant layer 4 laminated in this order was produced by laminating the sealant layer 4 by an extrusion lamination method on a laminate with the base material layer 1, the adhesive layer 2 and the metal layer 3 laminated in this order. In the battery packaging materials of Examples 4, 10 to 13 and 24 to 26, a coating layer was provided on the base material layer 1 on a side opposite to the metal layer. Specific conditions for producing the battery packaging material are as shown below.

First, a laminate with the base material layer 1, the adhesive layer 2 and the metal layer 3 laminated in this order was prepared. Specifically, the adhesive layer 2 composed of a two-liquid urethane adhesive agent including a polyester-based main agent and an isocyanate-based curing agent was formed in a thickness of 3 µm on one surface of the base material layer 1, and bonded (sand-laminated) to a chemically converted surface of the metal layer 3 by pressurization and heating to prepare a laminate with the base material layer 1, the adhesive layer 2 and the metal layer 3 laminated in this order.

A biaxially stretched nylon film having a thickness as described in Table 1 was used as the base material layer 1, and a metal layer 2 composed of aluminum foil as described in Table 1 was used as the metal layer 3. Each sheet of aluminum foil was subjected to a chemical conversion treatment by applying a treatment solution composed of a phenol resin, a chromium fluoride compound (trivalent) and phosphoric acid in an amount of 10 mg/m² on both surfaces of the metal layer by a roll coating method, and baking the treatment solution-applied metal layer for 20 seconds under the condition that the temperature of a formed film was 180° C. or higher.

Separately, the sealant layer 4 having a thickness and a configuration as described in Table 1 was formed by a co-extrusion lamination method. The sealant layer 4 was obtained by co-extruding a resin layer for forming a part on the metal layer side and a resin layer for forming a part on the innermost layer side. In Table 1, PPA is unsaturated carboxylic acid-graft-modified random polypropylene graft-modified with an unsaturated carboxylic acid, and PP is polypropylene (random copolymer). In the manner described above, the sealant layer having a thickness and a configuration as described in Table 1 was formed on a surface of the metal layer of the laminate including the base material layer 1, the adhesive layer 2 and the metal layer 3, thereby giving a battery packaging material of each of Examples 1 to 26 and Comparative Examples 1 to 4, which included a laminate with the base material layer 1, the adhesive layer 2, the metal layer 3 and the sealant layer 4 laminated in this order.

TABLE 1

| | Coating layer (µm) | Base material layer (µm) | Adhesive layer (µm) | Metal layer (µm) | Sealant layer (µm) (PPA) | Sealant layer (µm) (PP) | Total thickness (µm) | (Base material layer + metal layer)/ total of laminate | (Sealant layer)/ total of laminate | Base material layer/metal layer | Base material layer/(base material layer + metal layer) | Sealant layer/(base material layer + metal layer) |
|---|---|---|---|---|---|---|---|---|---|---|---|---|
| Example 1 | 0 | 15 | 3 | 30 | 14 | 10 | 72 | 0.625 | 0.333 | 0.500 | 0.333 | 0.533 |
| Example 2 | 0 | 12 | 3 | 25 | 14 | 10 | 64 | 0.578 | 0.375 | 0.480 | 0.324 | 0.649 |
| Example 3 | 0 | 12 | 3 | 25 | 13 | 9 | 62 | 0.597 | 0.355 | 0.480 | 0.324 | 0.595 |
| Example 4 | 3 | 12 | 3 | 25 | 14 | 10 | 64 | 0.578 | 0.375 | 0.480 | 0.324 | 0.649 |
| Example 5 | 0 | 20 | 3 | 25 | 14 | 10 | 72 | 0.625 | 0.333 | 0.800 | 0.444 | 0.533 |
| Example 6 | 0 | 15 | 3 | 20 | 14 | 10 | 62 | 0.565 | 0.387 | 0.750 | 0.429 | 0.686 |
| Example 7 | 0 | 12 | 3 | 20 | 14 | 10 | 59 | 0.542 | 0.407 | 0.600 | 0.375 | 0.750 |
| Example 8 | 0 | 10 | 3 | 20 | 14 | 10 | 57 | 0.526 | 0.421 | 0.500 | 0.333 | 0.800 |
| Example 9 | 0 | 9 | 3 | 20 | 14 | 10 | 56 | 0.518 | 0.429 | 0.450 | 0.310 | 0.828 |
| Example 10 | 3 | 15 | 3 | 20 | 14 | 10 | 65 | 0.538 | 0.369 | 0.750 | 0.429 | 0.686 |
| Example 11 | 3 | 12 | 3 | 20 | 14 | 10 | 62 | 0.516 | 0.387 | 0.600 | 0.375 | 0.750 |
| Example 12 | 3 | 10 | 3 | 20 | 14 | 10 | 60 | 0.500 | 0.400 | 0.500 | 0.333 | 0.800 |
| Example 13 | 3 | 9 | 3 | 20 | 14 | 10 | 59 | 0.492 | 0.407 | 0.450 | 0.310 | 0.828 |
| Example 14 | 0 | 25 | 3 | 15 | 14 | 10 | 67 | 0.597 | 0.358 | 1.667 | 0.625 | 0.600 |
| Example 15 | 0 | 15 | 3 | 15 | 14 | 10 | 57 | 0.526 | 0.421 | 1.000 | 0.500 | 0.800 |
| Example 16 | 0 | 12 | 3 | 15 | 14 | 10 | 54 | 0.500 | 0.444 | 0.800 | 0.444 | 0.889 |
| Example 17 | 0 | 10 | 3 | 15 | 14 | 10 | 52 | 0.481 | 0.462 | 0.667 | 0.400 | 0.960 |
| Example 18 | 0 | 9 | 3 | 15 | 14 | 10 | 51 | 0.471 | 0.471 | 0.600 | 0.375 | 1.000 |
| Example 19 | 0 | 25 | 3 | 15 | 20 | 15 | 78 | 0.513 | 0.449 | 1.667 | 0.625 | 0.875 |
| Example 20 | 0 | 15 | 3 | 15 | 20 | 15 | 68 | 0.441 | 0.515 | 1.000 | 0.500 | 1.167 |
| Example 21 | 0 | 12 | 3 | 15 | 20 | 15 | 65 | 0.415 | 0.538 | 0.800 | 0.444 | 1.296 |
| Example 22 | 0 | 10 | 3 | 15 | 20 | 15 | 63 | 0.397 | 0.556 | 0.667 | 0.400 | 1.400 |
| Example 23 | 0 | 9 | 3 | 15 | 20 | 15 | 62 | 0.387 | 0.565 | 0.600 | 0.375 | 1.458 |
| Example 24 | 3 | 12 | 3 | 15 | 14 | 10 | 57 | 0.474 | 0.421 | 0.800 | 0.444 | 0.889 |
| Example 25 | 3 | 10 | 3 | 15 | 14 | 10 | 55 | 0.455 | 0.436 | 0.667 | 0.400 | 0.960 |
| Example 26 | 3 | 9 | 3 | 15 | 14 | 10 | 54 | 0.444 | 0.444 | 0.600 | 0.375 | 1.000 |
| Comparative Example 1 | 0 | 6 | 3 | 10 | 14 | 10 | 43 | 0.372 | 0.558 | 0.600 | 0.375 | 1.500 |
| Comparative Example 2 | 0 | 6 | 3 | 9 | 14 | 10 | 42 | 0.357 | 0.571 | 0.667 | 0.400 | 1.600 |

TABLE 1-continued

| | Coating layer (µm) | Base material layer (µm) | Adhesive layer (µm) | Metal layer (µm) | Sealant layer (µm) | | Total thickness (µm) | Thickness ratio | | | | |
| | | | | | | | | (Base material layer + metal layer)/total of laminate | (Sealant layer)/total of laminate | Base material layer/metal layer | Base material layer/(base material layer + metal layer) | Sealant layer/(base material layer + metal layer) |
|---|---|---|---|---|---|---|---|---|---|---|---|---|
| | | | | | (PPA) | (PP) | | | | | | |
| Comparative Example 3 | 0 | 30 | 3 | 40 | 18 | 9 | 100 | 0.700 | 0.270 | 0.750 | 0.429 | 0.386 |
| Comparative Example 4 | 0 | 15 | 3 | 30 | 10 | 7 | 65 | 0.692 | 0.262 | 0.500 | 0.333 | 0.378 |

<Measurement of Total Thickness of Laminate>

The battery packaging material obtained as described above was cut to prepare a strip piece of 120×80 mm, and the strip piece was used as a test piece. The total thickness of the laminate was measured at the center portion of the test piece with use of a dial gauge (547-401 manufactured by Mitutoyo Corporation). The results are shown in Table 1.

<Evaluation of Moldability>

Each battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the heat-adhesive resin layer was situated on the male mold side, the test sample was pressed at a pressing pressure (surface pressure) of 0.1 MPa in such a manner that the molding depth was 5.5 mm, respectively, and cold molding (draw-in one-step molding) was performed. Presence/absence of pinholes and cracks in the metal layer of the molded battery packaging material was checked, and the ratio of generation (%) of pinholes and cracks was calculated. For the ratio of generation of pinholes and cracks, a test sample having even one pinhole or crack after being molded as described above was discriminated as a molding defective product, and the ratio of molding defective products occurring at the time of molding 30 test samples under the above-mentioned conditions was determined. The results are shown in Table 2.

<Evaluation of Piercing Strength>

In accordance with the specifications of JIS 1707: 1997, each of the battery packaging materials obtained as described above was pierced with a needle having a diameter of 1.0 mm and a semicircular tip shape with a radius of 0.5 mm at a rate of 50±5 mm per minute, and the maximum stress during passage of the needle through the battery packaging material was measured. The number of test pieces for each battery packaging material was set to 5, and the average value of maximum stresses was determined. For evaluation criteria, a test sample having a maximum stress of 12 N or more was rated as ○, and a test sample having a maximum stress of less than 12 N was rated as x. The results are shown in Table 2.

<Evaluation of Insulation Quality>

Each of the battery packaging materials obtained as described above was cut to a size of 40 mm (width)×100 mm (length) to obtain a test piece. Next, the test piece was folded with the short sides facing each other, and disposed in such a manner that the surfaces of two parts of the sealant layer of the test piece faced each other. Next, an aluminum electrode tab having a thickness of 100 µm and a width of 5 mm was inserted between the mutually facing surfaces of the sealant layer. Next, in this state, the sealant layers were heat-sealed with each other in a direction orthogonal to the length direction of the battery packaging material using a heat sealer including a flat heat plate having a width of 7 mm on both upper and lower sides. Next, a terminal of a tester was connected to each of the surfaces of the base material layer on both sides in such a manner that a portion of the battery packaging material where the aluminum tab was inserted was situated at the center. Next, a voltage of DC 25 V was applied between the testers for 15 seconds, and the resistance value therebetween was measured. For evaluation criteria of an insulation quality, a test piece having a resistance value of 1 MΩ or more was rated as ○, and a test piece having a resistance value of less than 1 MΩ was rated as x. The results are shown in Table 2.

<Evaluation of Sealing Strength>

Each of the battery packaging materials obtained as described above was cut to a strip piece of 60 mm (MD direction)×120 mm (TD direction). Each strip piece was folded in two in the TD direction, and the opposite two sides were heat-sealed with a width of 7 mm to form a bag having an opening on one end. Next, an opening portion of the obtained bag was heat-sealed in a width of 7 mm at a sealing temperature of 190° C., a surface pressure of 1.0 MPa, and a sealing time of 3.0 seconds. Next, the heat sealed part in the opening portion was cut into a strip of 15 mm wide, and the strip was drawn at a speed of 300 mm/minute using a tensile tester (AGS-50D (trade name) manufactured by Shimadzu Corporation), and the sealing strength was measured. The unit is N/15 mm wide. For evaluation criteria of sealing strength, a strip having a sealing strength of 60 N/15 mm or more was rated as ○, and a strip having a sealing stress of less than 60 N/15 mm was rated as x. The results are shown in Table 2.

<Evaluation of Resilience>

Resilience (bendability) of the battery packaging material was evaluated based on the loop stiffness value of each of the battery packaging materials obtained as described above. The loop stiffness value was measured by LOOP STIFFNESS TESTER manufactured by TOYO SEIKI Co., Ltd. (measurement conditions: sample width 15 mm, loop circumference 100 mm, post-crushing remaining distance 15 mm). The measurement was performed with the number of samples set to 5 (N=5), and the average value for the 5 samples was determined. For evaluation criteria, a sample having a loop stiffness value of 5.5 g to 12.0 g was rated as ○, and a sample having a loop stiffness value of less than 5.0 g or a loop stiffness value of 15.0 g or more was rated as x. The results are shown in Table 2.

<Evaluation of Electrolytic Solution Resistance>

Each of the battery packaging materials obtained as described above was cut to a size of 80 mm×150 mm, and then cold-molded to a depth of 3.0 mm at 0.4 MPa using a mold (female mold) having an opening size of 35 mm×50 mm and a mold (male mold) that is a counterpart to the female mold, so that a concave portion was formed at the central part of the battery packaging material. The concave portion was filled with 3 g of the electrolytic solution (including 1 M LiPF$_6$ and a mixed liquid of ethylene carbonate, diethyl carbonate and dimethyl carbonate (volume ratio 1:1:1)), another battery packaging material was superimposed on the concave portion in such a manner that the sealant layers faced each other, and the battery packaging materials are heat-sealed at the peripheral edge portion. As conditions for heat-sealing, the temperature was 190° C., the surface pressure was 1.0 MPa, and the time was 3 seconds. This was stored at 85° C. for 1 day, and then unsealed, and it was visually checked whether or not delamination occurred between the metal layer and the sealant layer. The results are shown in Table 2.

<Evaluation of Economic Efficiency/General-purpose Property>

Economic efficiency/general-purpose property was evaluated based on whether or not the lower limits of the thicknesses of the base material layer and the metal layer forming the battery packaging materials obtained as described above appear in catalogs and the like, and are generally available. For evaluation criteria, a sample having high economic efficiency/general-purpose property was rated as ○, a sample having slightly low economic efficiency/general-purpose property was rated as Δ, and a sample having low economic efficiency/general-purpose property was rated as x. The results are shown in Table 2.

TABLE 2

|  | Total thickness (μm) | Insulation quality | Sealing strength | Piercing strength | Moldability | Resilience | Electrolytic solution resistance (delaminated or not) | Economic efficiency/ general-purpose property |
|---|---|---|---|---|---|---|---|---|
| Example 1 | 72 | ○ | ○ | ○ | ○ | ○ | Not delaminated | ○ |
| Example 2 | 64 | ○ | ○ | ○ | ○ | ○ | Not delaminated | ○ |
| Example 3 | 62 | ○ | ○ | ○ | ○ | ○ | Not delaminated | ○ |
| Example 4 | 64 | ○ | ○ | ○ | ○ | ○ | Not delaminated | ○ |
| Example 5 | 72 | ○ | ○ | ○ | ○ | ○ | Not delaminated | ○ |
| Example 6 | 62 | ○ | ○ | ○ | ○ | ○ | Not delaminated | ○ |
| Example 7 | 59 | ○ | ○ | ○ | ○ | ○ | Not delaminated | ○ |
| Example 8 | 57 | ○ | ○ | ○ | ○ | ○ | Not delaminated | Δ |
| Example 9 | 56 | ○ | ○ | ○ | ○ | ○ | Not delaminated | Δ |
| Example 10 | 65 | ○ | ○ | ○ | ○ | ○ | Not delaminated | ○ |
| Example 11 | 62 | ○ | ○ | ○ | ○ | ○ | Not delaminated | ○ |
| Example 12 | 60 | ○ | ○ | ○ | ○ | ○ | Not delaminated | Δ |
| Example 13 | 59 | ○ | ○ | ○ | ○ | ○ | Not delaminated | Δ |
| Example 14 | 67 | ○ | ○ | ○ | ○ | ○ | Not delaminated | Δ |
| Example 15 | 57 | ○ | ○ | ○ | ○ | ○ | Not delaminated | Δ |
| Example 16 | 54 | ○ | ○ | ○ | ○ | ○ | Not delaminated | Δ |
| Example 17 | 52 | ○ | ○ | ○ | ○ | ○ | Not delaminated | Δ |
| Example 18 | 51 | ○ | ○ | ○ | ○ | ○ | Not delaminated | Δ |
| Example 19 | 78 | ○ | ○ | ○ | ○ | ○ | Not delaminated | Δ |
| Example 20 | 68 | ○ | ○ | ○ | ○ | ○ | Not delaminated | Δ |
| Example 21 | 65 | ○ | ○ | ○ | ○ | ○ | Not delaminated | Δ |
| Example 22 | 63 | ○ | ○ | ○ | ○ | ○ | Not delaminated | Δ |
| Example 23 | 62 | ○ | ○ | ○ | ○ | ○ | Not delaminated | Δ |
| Example 24 | 57 | ○ | ○ | ○ | ○ | ○ | Not delaminated | Δ |
| Example 25 | 55 | ○ | ○ | ○ | ○ | ○ | Not delaminated | Δ |
| Example 26 | 54 | ○ | ○ | ○ | ○ | ○ | Not delaminated | Δ |
| Comparative Example 1 | 43 | ○ | ○ | x | x | x | Not delaminated | x |
| Comparative Example 2 | 42 | ○ | ○ | x | x | x | Not delaminated | x |
| Comparative Example 3 | 100 | ○ | ○ | ○ | ○ | ○ | Not delaminated | ○ |
| Comparative Example 4 | 65 | x | x | ○ | ○ | ○ | Delaminated | ○ |

DESCRIPTION OF REFERENCE SIGNS

1: Base material layer
2: Adhesive layer
3: Metal layer
4: Sealant layer
5: Adhesive layer

The invention claimed is:

1. A battery packaging material comprising a laminate having at least a base material layer, a metal layer and a sealant layer laminated in this order, wherein
   the base material layer comprises at least one of a polyester resin or a polyamide resin,
   a total thickness of the laminate is in a range of 50 to 80 μm, and
   a ratio of a sum of thicknesses of the base material layer and the metal layer to a total thickness of the laminate is in a range of 0.380 to 0.630.

2. The battery packaging material according to claim 1, wherein a ratio of a thickness of the sealant layer to the total thickness of the laminate is in a range of 0.300 to 0.570.

3. The battery packaging material according to claim 1, wherein
   the thickness of the base material layer is in a range of 9 to 25 μm,
   the thickness of the metal layer is in a range of 15 to 30 μm, and the thickness of the sealant layer is in a range of 22 to 35 μm.

4. The battery packaging material according to claim 1, wherein the base material layer is a biaxially stretched nylon film or a biaxially stretched PET film.

5. The battery packaging material according to claim 1, wherein the metal layer is formed of aluminum foil.

6. A battery comprising a battery element including at least a positive electrode, a negative electrode and an electrolyte, the battery element being stored in the battery packaging material according to claim 1.

7. A method for producing a battery, the method comprising:
 a step of storing in a battery packaging material a battery element including at least a positive electrode, a negative electrode and an electrolyte, wherein
 the battery packaging material includes a laminate having at least a base material layer, a metal layer and a sealant layer laminated in this order,
 the base material layer comprises at least one of a polyester resin or a polyamide resin,
 a total thickness of the laminate is in a range of 50 to 80 μm, and
 a ratio of a sum of thicknesses of the base material layer and the metal layer to
 a total thickness of the laminate is in a range of 0.380 to 0.630.

8. A method of using a battery packaging material, the method comprising:
 a step of hermetically sealing a battery element including at least a positive electrode, a negative electrode and an electrolyte within the battery packaging material, wherein
 the battery packaging material includes a laminate having at least a base material layer, a metal layer and a sealant layer laminated in this order,
 the base material layer comprises at least one of a polyester resin or a polyamide resin,
 a total thickness of the laminate is in a range of 50 to 80 μm, and
 a ratio of a sum of thicknesses of the base material layer and the metal layer to a total thickness of the laminate is in a range of 0.380 to 0.630.

* * * * *